(12) United States Patent
Michelini et al.

(10) Patent No.: US 7,730,870 B2
(45) Date of Patent: Jun. 8, 2010

(54) ENGINE DYNAMIC LOAD LEVELING

(75) Inventors: John O. Michelini, Sterling Heights, MI (US); Ilya V. Kolmanovsky, Novi, MI (US); Alex Gibson, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 768 days.

(21) Appl. No.: 11/608,711

(22) Filed: Dec. 8, 2006

(65) Prior Publication Data

US 2008/0135021 A1 Jun. 12, 2008

(51) Int. Cl.
*F01L 1/34* (2006.01)
*F02D 7/00* (2006.01)
*G06F 19/00* (2006.01)

(52) U.S. Cl. ............... 123/295; 123/481; 123/90.15; 701/103

(58) Field of Classification Search ............. 123/295, 123/299, 305, 348, 90.11, 90.15, 481; 701/103–105
See application file for complete search history.

(56) References Cited

U.S. PATENT DOCUMENTS

| | | | |
|---|---|---|---|
| 6,390,054 B1 | 5/2002 | Yang | |
| 6,640,771 B2 * | 11/2003 | Fuerhapter | 123/295 |
| 6,662,785 B1 | 12/2003 | Sloane et al. | |
| 6,725,825 B1 | 4/2004 | Kurtz et al. | |
| 7,167,789 B1 * | 1/2007 | Froloff et al. | 701/101 |
| 7,184,877 B1 * | 2/2007 | de Ojeda | 701/104 |
| 7,240,480 B1 * | 7/2007 | Brevick et al. | 60/280 |
| 7,334,562 B2 * | 2/2008 | Jacobsson et al. | 123/299 |
| 7,337,762 B2 * | 3/2008 | Eng et al. | 123/295 |
| 2004/0182359 A1 | 9/2004 | Stewart et al. | |
| 2006/0196466 A1 * | 9/2006 | Kuo et al. | 123/295 |
| 2008/0066713 A1 * | 3/2008 | Megli et al. | 123/295 |
| 2008/0066715 A1 * | 3/2008 | Jankovic | 123/302 |

* cited by examiner

*Primary Examiner*—Willis R. Wolfe, Jr.
*Assistant Examiner*—Johnny H Hoang
(74) *Attorney, Agent, or Firm*—Allan J. Lippa; Alleman Hall McCoy Russell & Tuttle LLP (57) ABSTRACT

A method for controlling an internal combustion engine having a plurality of cylinders using electronic valve actuation, including operating a first portion of the cylinders in a homogeneous charge compression ignition (HCCI) mode, operating a second portion of the cylinders in a non-HCCI mode, and adjusting the valve timing of the second portion of cylinders to dynamically load level the engine in response to a transient torque demand. A system for controlling a multiple cylinder internal combustion engine, including a first group of cylinders to operate in an HCCI mode, a second group of cylinders to operate in a non-HCCI mode, and an engine controller operably coupled to the first and second groups of cylinders, said controller to adjust the valve timing of the second group of cylinders to dynamically load level the engine in response to a transient torque demand.

20 Claims, 6 Drawing Sheets

ENGINE DYNAMIC LOAD LEVELING

FIELD

The present application relates to controlling dynamic load leveling in an engine.

BACKGROUND AND SUMMARY

Vehicles having an internal combustion engine can operate in a variety of modes. As one example, an engine may operate in a spark ignition (SI) mode, wherein a charge of a mixture of air and fuel is ignited by a spark performed by a sparking device within a combustion chamber. As another example, an engine may operate in a compression ignition mode, wherein a mixture of air and fuel are compressed within a combustion chamber by a piston, causing ignition of the charge without necessarily requiring the addition of a spark from a sparking device.

One type of compression ignition known as homogeneous charge compression ignition (HCCI) utilizes compression of a substantially homogeneous mixture of air and fuel to achieve controlled auto-ignition (CAI). In HCCI engines, ignition occurs virtually simultaneously throughout a combustion chamber as a result of compression instead of spark ignition, making the combustion process challenging to control. HCCI engines are similar to gasoline engines in having a homogeneous charge, but are similar to diesel engines in having compression ignition. HCCI engines may be used to combine gasoline engine low emissions with diesel engine efficiency.

HCCI combustion engines typically change operation conditions more slowly then other combustion processes. The engine hardware used to control initial cylinder conditions such as internal residuals, intake air temperatures, and the combustion process stability window, limits dynamic response.

In one approach, as described in U.S. Pat. No. 6,725,825, issued to Kurtz, et al., an engine combustion mode may be controlled to improve dynamic response. In particular, Kurtz discusses providing a net torque equal to a driver demanded torque by transitioning a portion of the cylinders from a first to a second combustion mode, such as from an HCCI combustion mode to a SI combustion mode.

However, the inventors herein have recognized disadvantages with this approach. Specifically, transition of a cylinder between combustion modes can increase combustion control challenges, reduce efficiency benefits from combustion ignition cylinders, and increase emissions, increase noise, vibration and harshness (NVH), and provide a less smooth torque delivery.

In a first approach, as described herein, the above issues may be addressed by controlling an internal combustion engine having a plurality of cylinders using electronic valve actuation by operating a first portion of the cylinders in an HCCI combustion mode, operating a second portion of the cylinders in a non-HCCI combustion mode, and adjusting the valve timing of the second portion of cylinders to dynamically load level the engine in response to a transient torque demand.

In a second approach, also described herein, the above issues may be addressed by controlling an internal combustion engine having a plurality of cylinders by operating a first portion of the cylinders in an HCCI combustion mode, operating a second portion of the cylinders in a non-HCCI combustion mode, and adjusting the torque provided by the second portion of cylinders more than adjustment of torque provided by the first portion of cylinders to respond to a transient torque demand. Thus, while torque is adjusted in both cylinder portions, a greater adjustment is provided by the non-HCCI combustion cylinders to enable improved control of the HCCI portion.

In another approach, also described herein, the above issues may be addressed by a system for controlling a multiple cylinder internal combustion engine that includes a first group of cylinders to operate in a homogeneous charge compression ignition mode, a second group of cylinders to operate in a spark ignition mode, and an engine controller operably coupled to the first and second groups of cylinders, said controller to adjust the valve timing of the second group of cylinders to dynamically load level the engine in response to a transient torque demand.

DETAILED DESCRIPTION

Figure 1:
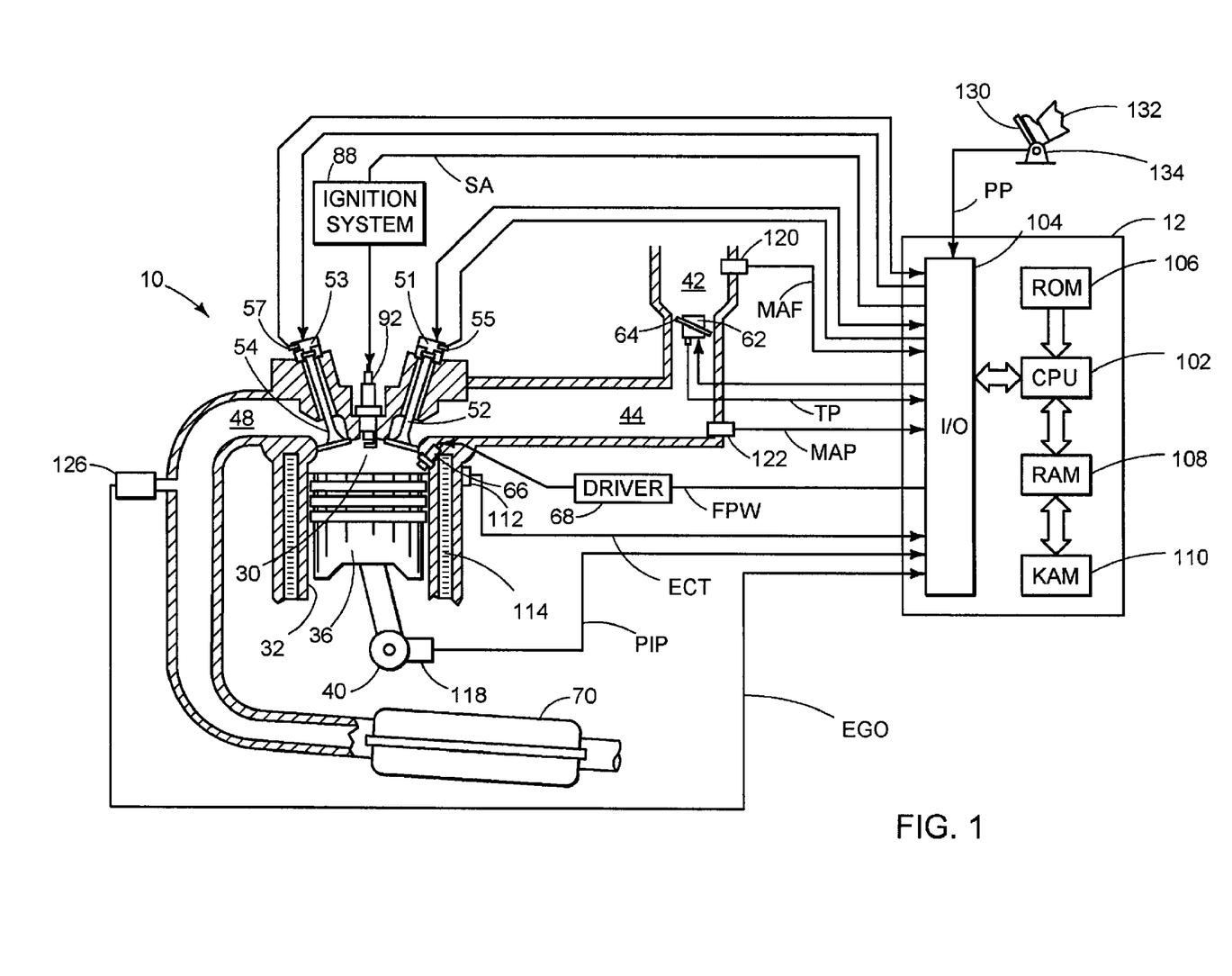
FIG. 1 is a schematic diagram of a portion of an example internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example.

Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa.

During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. As described above, FIG. 1 shows only one cylinder of a multi-cylinder engine, and that each cylinder may similarly include its own set of intake/exhaust valves, fuel injector, spark plug, etc.

Figure 2A:
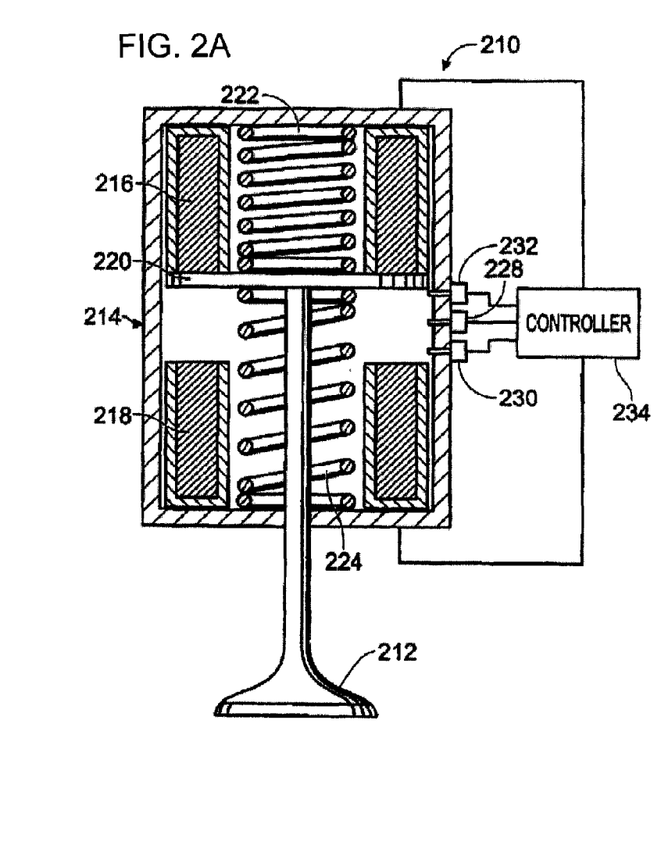
FIGS. 2A and 2B are schematic diagrams of an example electric valve actuation system in a first position and a second position.
Figure 2B:
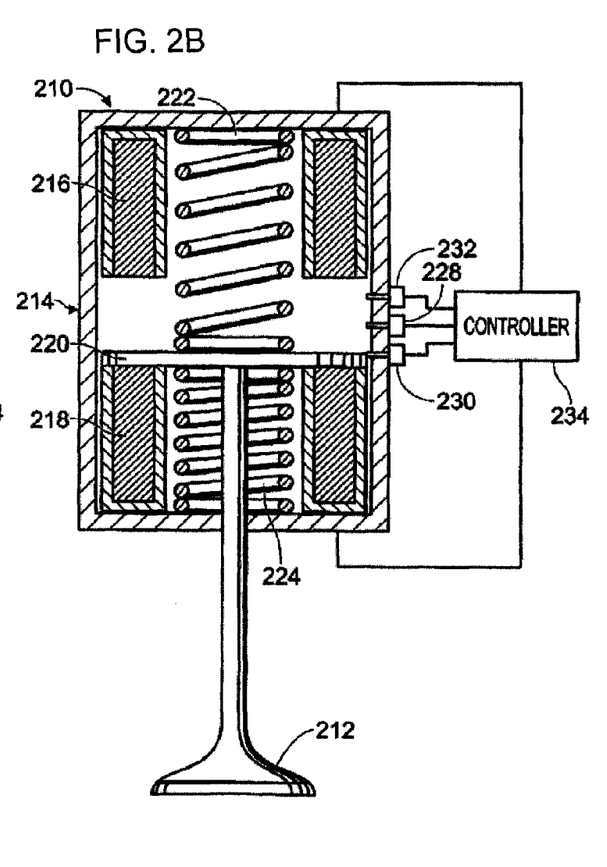
Figure 2C:
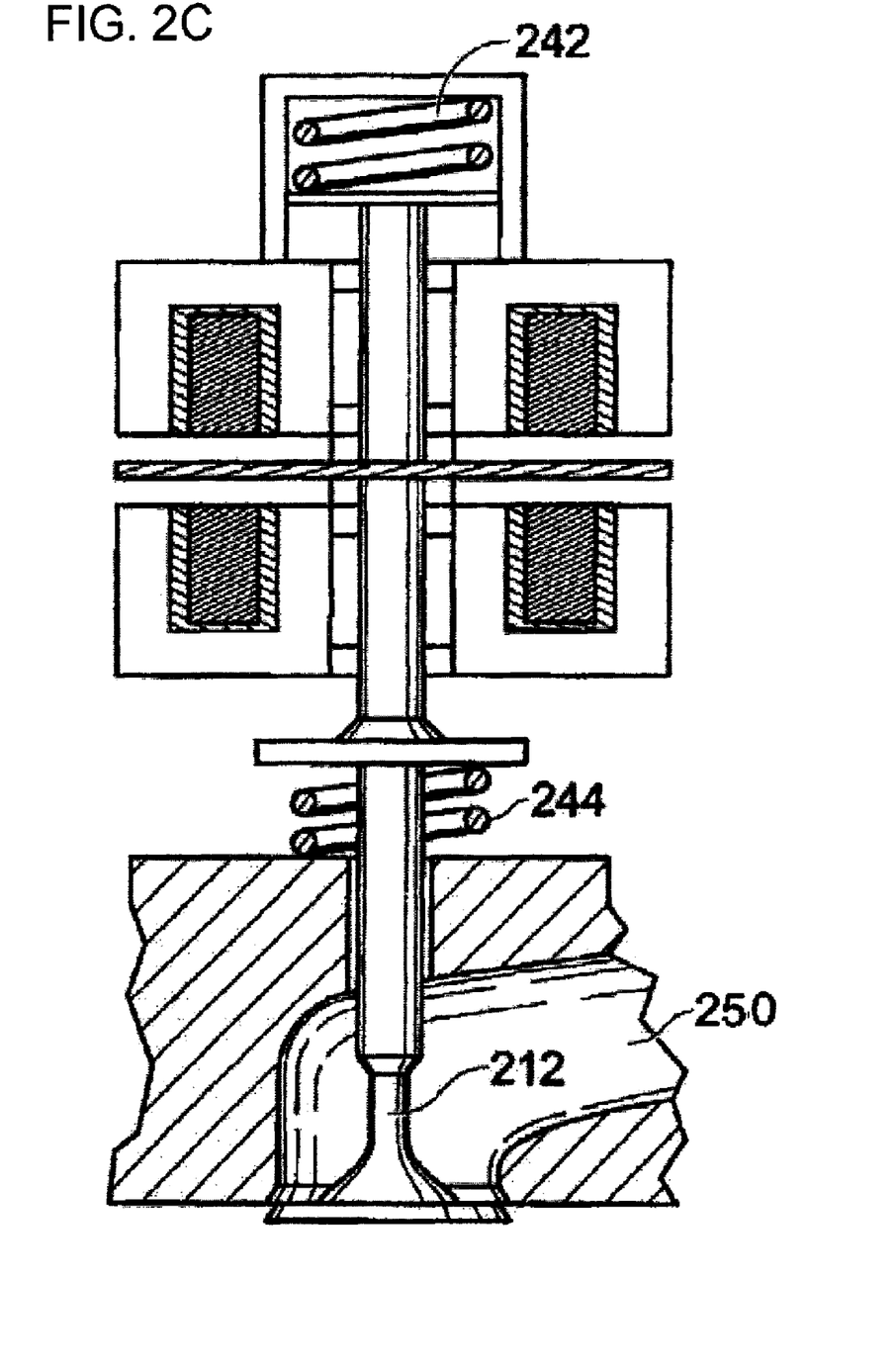
FIG. 2C is a schematic diagram of an example electric valve actuation system.

FIGS. 2A, 2B, and 2C show a detailed view of an EVA system and valve that may be used as one of the intake or exhaust valves described above with reference to FIG. 1. Referring to FIGS. 2A and 2B, an EVA system 210 is shown for controlling movement of a valve 212 of a cylinder between a fully closed position (shown in FIG. 2A), and a fully open position (shown in FIG. 2B). The apparatus 210 includes an electric valve actuator (EVA) 214 with upper and lower coils 216 and 218 which electromagnetically drive an armature 220 against the force of upper and lower springs 222 and 224 for controlling movement of the valve 212.

One or more sensors 228, 230, and 232 may be provided for detecting a position, velocity and/or acceleration of armature 220. As one embodiment, at least one of sensors 228, 230, and 232 may include a switch type sensor that detects when armature 220 passes within a region of the sensor. In some embodiments, at least one of sensors 228, 230, and 232 may provide continuous position, velocity, and/or acceleration data to the control system for the armature and/or valve position.

Controller 234, which can be combined into controller 12, or act as a separate controller portion of the control system is shown operatively connected to position sensors 228, 230, and 232, and to the upper and lower coils 216 and 218 to control actuation and landing of valve 212. As described above, engine 10 has one or more electric valve actuators that may be used to vary the lift height, lift duration, and/or opening and closing timing in response to operating conditions of the engine.

FIG. 2C shows an alternative embodiment of an EVA system including a dual coil oscillating mass actuator with an engine valve actuated by a pair of opposing electromagnetic coils (e.g. solenoids), which are designed to overcome the force of a pair of opposing valve springs 242 and 244 arranged differently than the actuator of FIGS. 2A and 2B. Other components of the electric valve actuation system of FIG. 2C may be similar to those of FIGS. 2A and 2B, except that FIG. 2C shows port 250, which can be an intake or exhaust port of a cylinder of the engine. Applying a variable voltage to the coil of the electromagnet induces current to flow, which controls the force produced by each electromagnet. With some EVA systems, each electromagnet that makes up an actuator may be only able to produce a force in one direction, independent of the polarity of the current in its coil.

As illustrated above, the electrically actuated valves in the engine may remain in a half open position when the actuators are de-energized (e.g. no current is supplied). Therefore, prior to a combustion operation of the cylinder, each valve may go through an initialization cycle. During an initialization cycle, the actuators can be pulsed with current, in a prescribed manner, in order to establish the valves in the fully closed or fully open position. Further, as will be described below in greater detail, the initialization cycle may include a determination of a base level of holding current for one or more magnetic coils of the EVA system.

Following this initialization, the valves can be sequentially actuated according to the desired valve timing and firing order by the pair of electromagnetic coils, a first electromagnetic coil (e.g. the lower coil) for pulling the valve open and a second electromagnetic coil (e.g. the upper coil) for pulling the valve closed.

The magnetic properties of each electromagnet may be such that only a single electromagnetic coil (upper or lower) need be energized at any time. Since one of the coils (e.g. the upper coil) holds the valve closed for the majority of each engine cycle, it may be operated for a much higher percentage of time than that of the other coils (e.g. the lower coil).

In an engine 10 with some cylinders operating in an HCCI combustion mode and some cylinders operating in a non-HCCI mode, the engine can respond to dynamic torque demands by rapidly changing overall engine torque with the non-HCCI cylinders while the HCCI cylinders change more slowly. In some embodiments, some or all of the non-HCCI cylinders can provide high frequency torque response by changing combustion modes, air charge, operational states, or even by deactivating some of the cylinders.

In one embodiment, a multi-cylinder engine 10 may use electronic valve actuation (EVA) together with HCCI on at least one cylinder to reduce or eliminate transitions of cylinders between combustion modes, improve combustion control, improve engine efficiency, decrease emissions, decrease noise, vibration and harshness (NVH), and provide a smooth torque delivery.

The non-HCCI cylinders can provide dynamic load leveling similar to an electric motor in a parallel hybrid system, at considerable lower cost. For example, valve timing may be adjusted to adjust the air charge provided to certain cylinders and provide a dynamic torque response with the cylinders operating in a mode that allow quick changes in operating conditions.

During a transient condition, the non-HCCI cylinders could rapidly change engine torque while the HCCI cylinder would change much more slowly. After the transient as the HCCI cylinder reaches the optimal steady state operation the non-HCCI cylinder would decrease or increase output to match total torque demand. To reduce NVH, the HCCI and base combustion cylinders could be adjusted to fire with even crank angle spacing. In some embodiments, the even crank angle spacing could be phased out as engine speed increases.

In some embodiments, the ratio of HCCI cylinders to non-HCCI cylinders could also be adjusted to better satisfy transient torque requirements depending on engine operation conditions, engine configuration, and vehicle configuration, or to improve fuel economy.

Figure 3:
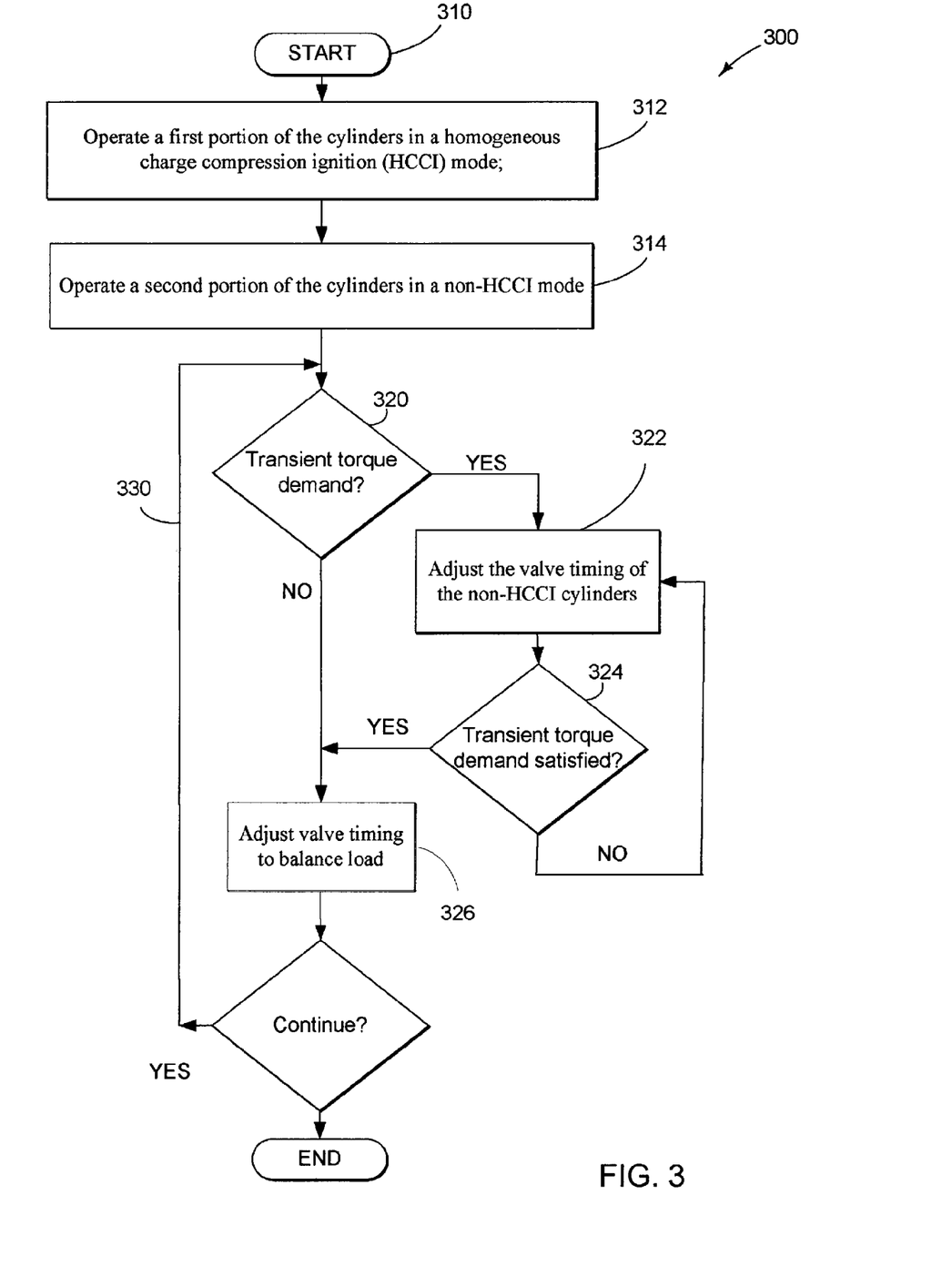
FIG. 3 is a flow diagram of a method to dynamically load level an engine with some cylinders operating under compression ignition.

FIG. 3 is a flow diagram of a method 300 to dynamically load level an engine. In block 312, an internal combustion engine 10 having a plurality of cylinders may be controlled by operating a first portion of the cylinders in an HCCI combustion mode. In block 314, a second portion of the cylinders may be operated in a non-HCCI combustion mode. In some embodiments, at least some of the non-HCCI cylinders may be direct-injection stratified-charge spark ignition cylinders, homogeneous-charge spark-ignition cylinders, or heterogeneous-charge compression-ignition cylinders.

In response to a transient torque requirement 320, the valve timing of the second portion of cylinders may be adjusted in block 322 to dynamically load level the engine 10. A transient torque requirement may be an increase in required torque or a decrease in required torque.

In some embodiments, method 300 may further include adjusting the ratio of HCCI cylinders to non-HCCI cylinders depending on engine operation conditions, engine configuration, and vehicle configuration. Furthermore, an embodiment may deactivate at least some of the non-HCCI cylinders during the transient torque demand. In some embodiments, the first portion and second portion of cylinders may be operated with even crank angle spacing to reduce noise, vibration and harshness. In some embodiments, the even crank angle phasing could be phased out as engine speed increases.

In decision block 324, if the adjustments to valve timing of the non-HCCI cylinders are not enough to satisfy the transient torque demand, then the valve timing may further be adjusted. In alternate embodiments, other variations of air charge, combustion mode, etc., may be adjusted to provide a rapid response to torque requirements with the non-HCCI cylinders. Additionally, some embodiments may skip decision block 324 and simply enter the transient torque demand loop starting at decision block 320.

In block 326, the valve timing may be adjusted to balance the load over all non-HCCI and HCCI cylinders. After engine 10 adjusts valve timing in block 322 in response to a transient torque demand in block 320, it can gradually adjust valve timing to balance the load by adjusting the valve timing to keep the non-HCCI cylinders in a selected range and by continuing to adjust the HCCI cylinder valve timing until the load reaches a desired balance over HCCI and non-HCCI cylinders. Method 300 enables large increases and decreases in torque from non-HCCI cylinders to handle transient conditions, and also balances the load between non-HCCI cylinders and HCCI cylinders after the valve timing was adjusted in response to the torque demand. Load balancing, also called load leveling, may also utilize transitions in the number of cylinders in different modes to maintain the supplied torque for each portion of cylinders within a selected range.

In this way, it is possible to increase the dynamic response of an engine having at least some HCCI cylinders while reducing transitions out of HCCI and improving the amount of time cylinders can stay in HCCI mode. As HCCI cylinders approach steady state operation after a transient torque demand, non-HCCI cylinders could decrease or increase output to match total torque demand.

Figure 4:
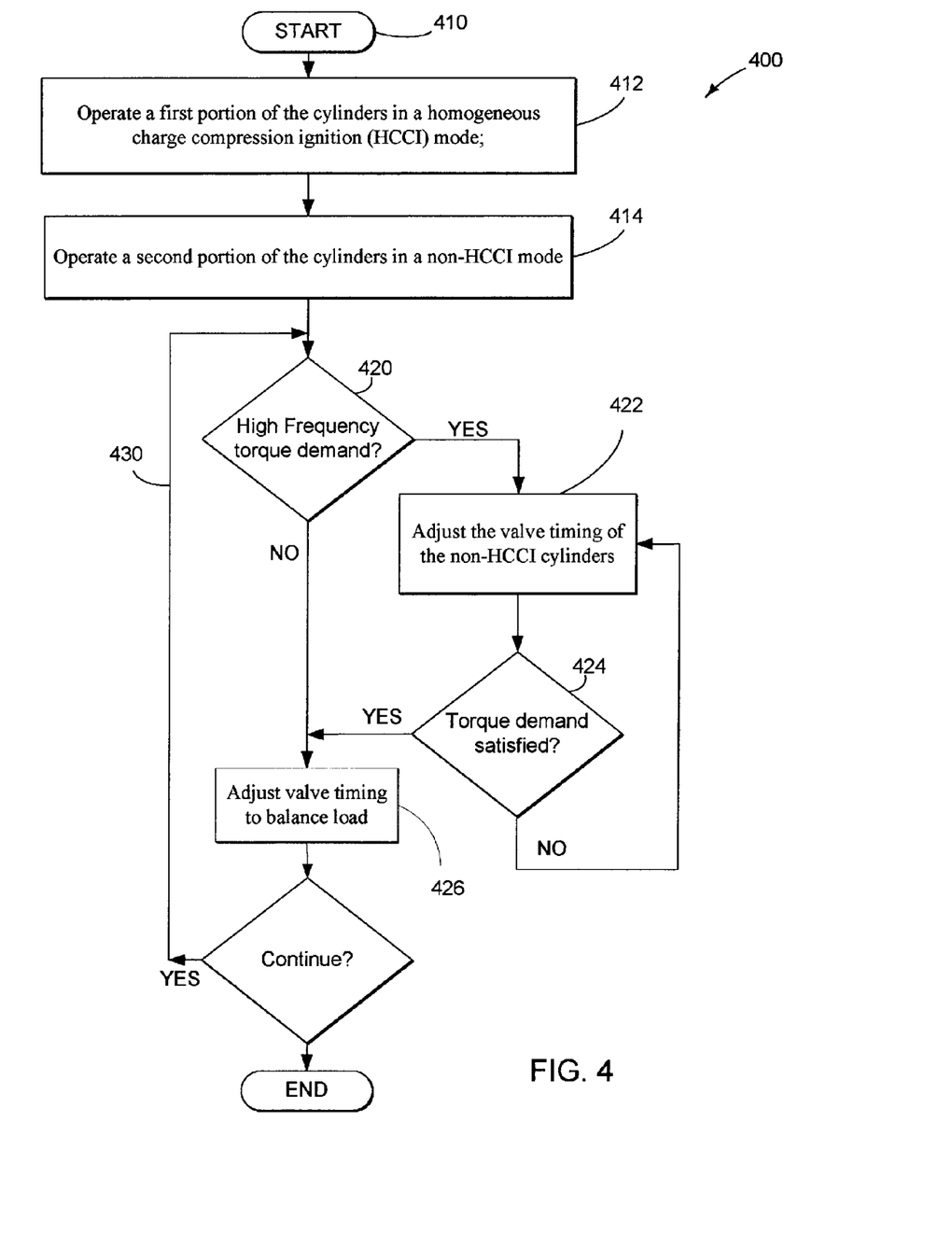
FIG. 4 is a flow diagram of a method to dynamically load level an engine by using some cylinders to respond to high frequency torque demands and other cylinders to respond to low frequency torque demands.

FIG. 4 is a flow diagram of a method 400 to dynamically load level an engine. In block 412, an internal combustion engine 10 having a plurality of cylinders may be controlled by operating a first portion of the cylinders in an HCCI combustion mode. In block 414, a second portion of the cylinders may be operated in a non-HCCI combustion mode. In some embodiments, at least some of the non-HCCI cylinders may be direct-injection stratified-charge spark ignition cylinders, homogeneous-charge spark-ignition cylinders, or heterogeneous-charge compression-ignition cylinders.

In response to a high frequency torque requirement 420, the valve timing of the second portion of cylinders may be adjusted in block 422 to dynamically load level the engine 10. A high frequency torque requirement may be a relatively rapid increase or decrease in required torque.

In some embodiments, method 400 may further include adjusting the ratio of HCCI cylinders to non-HCCI cylinders depending on engine operation conditions, engine configuration, and vehicle configuration. Furthermore, an embodiment may deactivate at least some of the non-HCCI cylinders during the transient torque demand. In some embodiments, the first portion and second portion of cylinders may be operated with even crank angle spacing to reduce noise, vibration and harshness. In some embodiments, the even crank angle phasing could be phased out as engine speed increases.

In decision block 424, if the adjustments to valve timing of the non-HCCI cylinders are not enough to satisfy the transient torque demand, then the valve timing may further be adjusted. In alternate embodiments, other variations of air charge, combustion mode, etc., may be adjusted to provide a rapid response to torque requirements with the non-HCCI cylinders. Additionally, some embodiments may skip decision block 424 and simply enter the transient torque demand loop starting at decision block 420.

In block 426, the valve timing may be adjusted to balance the load over all non-HCCI and HCCI cylinders. After engine 10 adjusts valve timing in block 422 in response to a high frequency torque demand in block 420, it can gradually adjust valve timing to balance the load by adjusting the valve timing to keep the non-HCCI cylinders in a selected range and by continuing to adjust the HCCI cylinder valve timing until the load reaches a desired balance over HCCI and non-HCCI cylinders. Method 400 enables large increases and decreases in torque from non-HCCI cylinders to handle various torque frequency demands, and also balances the load between non-HCCI cylinders and HCCI cylinders after the valve timing was adjusted in response to the torque demand. Load balancing, also called load leveling, may also utilize transitions in the number of cylinders in different modes to maintain the supplied torque for each portion of cylinders within a selected range.

As an example, a desired torque may comprise a components related to average speed, average efficiency, average load, etc., as well as transient components including passing, changes in inclination, sudden throttle opening or closing. Higher frequency torque demands correspond to transient demands, either increases or decreases, relative to relatively static or average torque demands which may be considered lower frequency torque demands.

By separating torque demands into higher and lower frequency components, method 400 can provision the higher frequency demands to the cylinders best suited, for example the non-HCCI cylinders, while utilizing the HCCI and the non-HCCI cylinders to respond to the lower frequency torque demands. In some embodiments, the low frequency component may be split between the HCCI and non-HCCI cylinders depending on the requested torque and current load balance. For example, the load may be balanced to keep the HCCI cylinders within HCCI combustion mode and vary both higher and lower frequency response even more in the non-HCCI cylinders.

In this way, it is possible to increase the dynamic response of an engine having at least some HCCI cylinders while reducing transitions out of HCCI and improving the amount of time cylinders can stay in HCCI mode. As HCCI cylinders approach steady state operation after a transient torque demand, non-HCCI cylinders could decrease or increase output to match total torque demand.

Figure 5:
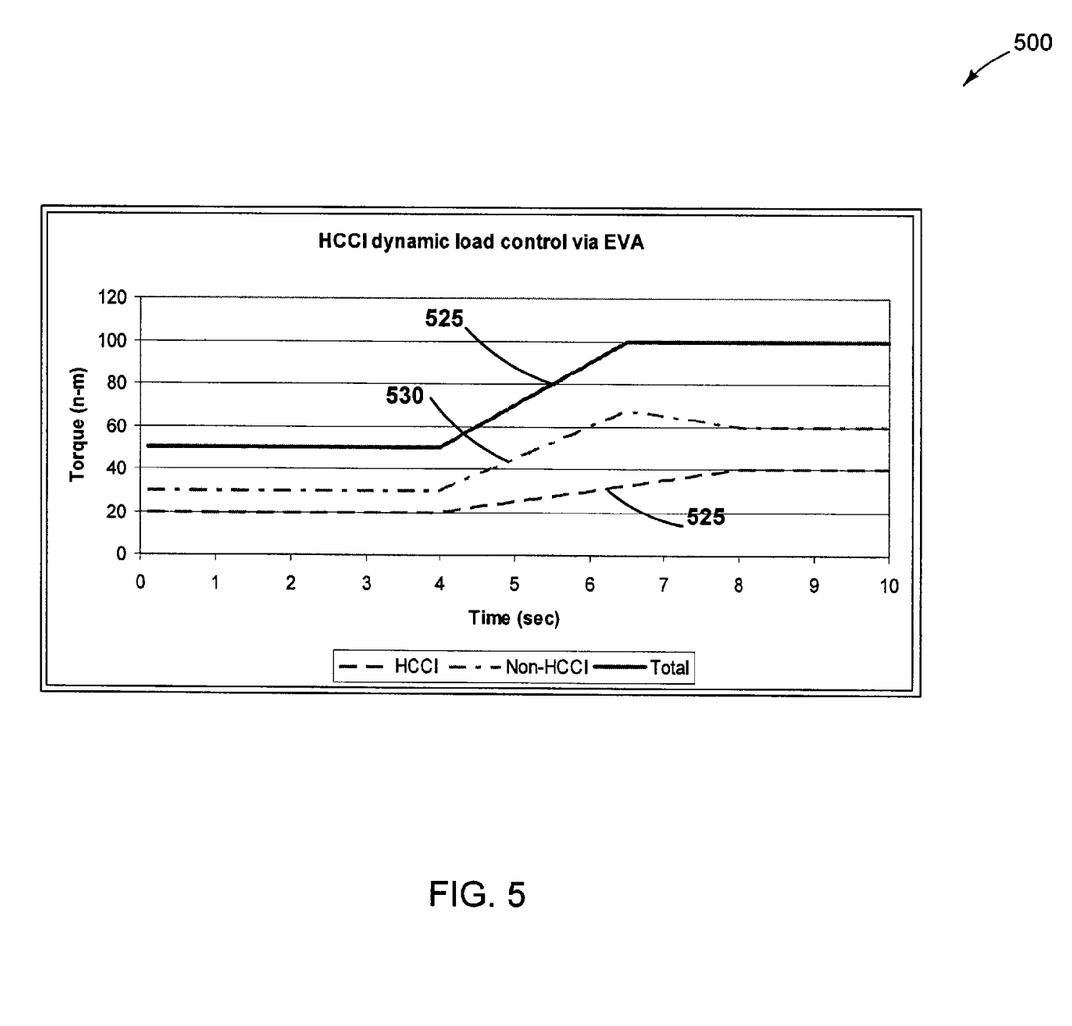
FIG. 5 is a graph illustrating an embodiment to dynamically load level an engine in response to a transient torque demand.

FIG. 5 is a graph illustrating an embodiment to dynamically load level an engine in response to a transient torque demand 525. FIG. 5 illustrates an increase in torque demand, but embodiments may also respond to a decrease in torque demand. Referring to the figure, at time equal to 4 seconds, a transient torque demand increase overall required torque from approximately 50 Newton-meters to 100 Newton-meters at approximately time equal to 6.5 seconds.

In response to this transient torque demand, the non-HCCI cylinders can be adjusted more quickly to supply torque than the HCCI cylinders, as can be evidenced by the slope of the non-HCCI torque line 530 as compared to HCCI torque line 525. In some embodiments, when overall torque requirements become more static, the dynamic torque response from the non-HCCI cylinders may be reduced and the torque provided by HCCI cylinders may be slowly adjusted, so the overall torque requirements are substantially satisfied.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A method for an engine having a plurality of cylinders using electronic-valve-actuation, comprising:
   operating a first portion of the cylinders in a homogeneous charge compression ignition (HCCI) mode;
   operating a second portion of the cylinders in a non-HCCI mode;
   adjusting valve timing of the non-HCCI cylinders to dynamically load level the engine in response to a transient torque demand; and
   after the transient torque demand, adjusting the non-HCCI cylinders to balance a load over all non-HCCI and HCCI cylinders.

2. The method of claim 1, further comprising adjusting a ratio of HCCI cylinders to non-HCCI cylinders depending on engine operation conditions, engine configuration, and vehicle configuration.

3. The method of claim 1, wherein the non-HCCI cylinders change combustion modes during the transient torque demand.

4. The method of claim 3, wherein at least some of the non-HCCI cylinders are direct-injection stratified-charge spark ignition cylinders, homogeneous-charge spark-ignition cylinders, or heterogeneous-charge compression-ignition cylinders.

5. The method of claim 1, wherein at least some of the non-HCCI cylinders are deactivated during the transient torque demand.

6. The method of claim 1, further comprising operating the first portion and second portion of cylinders with even crank angle spacing, wherein the dynamic load leveling includes balancing the load over all non-HCCI and HCCI cylinders, where after adjusting valve timing in response to the transient torque demand, valve timing of the second portion of cylinders is adjusted to keep the non-HCCI cylinders in a selected range and valve timing of the first portion of cylinders is adjusted until the load reaches a desired balance over HCCI and non-HCCI cylinders.

7. A system for controlling a multiple cylinder internal combustion engine, comprising:
a first portion of cylinders to operate in a homogeneous charge compression ignition (HCCI) mode;
a second portion of cylinders to operate in a non-HCCI mode; and
an engine controller operably coupled to the first and second portions of cylinders, said controller to adjust valve timing of the second portion of cylinders to a greater extent than the first portion of cylinders to dynamically load level the engine in response to a transient torque demand, where after the transient torque demand, the controller adjusts the non-HCCI cylinders to balance a load over all non-HCCI and HCCI cylinders.

8. The system of claim 7, wherein the engine controller is operably configured to adjust a ratio of HCCI cylinders to non-HCCI cylinders depending on engine operation conditions, engine configuration, and vehicle configuration.

9. The system of claim 7, wherein the engine controller is operably configured to change combustion modes of the non-HCCI cylinders during the transient torque demand.

10. The system of claim 9, wherein at least some of the non-HCCI cylinders are direct-injection stratified-charge spark ignition cylinders, homogeneous-charge spark-ignition cylinders, or heterogeneous-charge compression-ignition cylinders.

11. The system of claim 7, wherein the engine controller is operably configured to deactivate at least some of the non-HCCI cylinders during the transient torque demand.

12. The system of claim 7, wherein the engine controller is operably configured to adjust the first portion and second portion of cylinders to have even crank angle spacing.

13. The system of claim 12, wherein the engine controller is operably configured to phase out the even crank angle spacing as engine speed increases.

14. The system of claim 7, wherein the cylinders have electronically actuated valves.

15. A method for controlling an internal combustion engine having a plurality of cylinders, comprising:
operating a first portion of the cylinders in a homogeneous charge compression ignition (HCCI) mode;
operating a second portion of the cylinders in a non-HCCI mode; and
adjusting a torque provided by the second portion of cylinders to respond to a high frequency torque demand and adjusting a torque provided by the first portion of cylinders to respond to a low frequency torque demand, where adjusting the torque provided by the second portion of cylinders includes adjusting a valve timing of the second portion of cylinders to dynamically load level the engine, where the torque adjustment in both cylinder portions includes a greater adjustment, and a faster adjustment, provided by the non-HCCI cylinders as compared to the HCCI cylinders, and where the dynamic load leveling includes balancing a load over all non-HCCI and HCCI cylinders, where after adjusting valve timing in response to the high frequency torque demand, the valve timing of the second portion of cylinders is adjusted to keep the non-HCCI cylinders in a selected range and valve timing of the first portion of cylinders is adjusted until the load reaches a desired balance over HCCI and non-HCCI cylinders.

16. The method of claim 15, further comprising adjusting a ratio of HCCI cylinders to non-HCCI cylinders depending on engine operation conditions, engine configuration, and vehicle configuration.

17. The method of claim 15, wherein the non-HCCI cylinders change combustion modes during the high frequency torque demand.

18. The method of claim 17, wherein at least some of the non-HCCI cylinders are direct-injection stratified-charge spark ignition cylinders, homogeneous-charge spark-ignition cylinders, or heterogeneous-charge compression-ignition cylinders.

19. The method of claim 15, wherein at least some of the non-HCCI cylinders are deactivated during high frequency torque demand.

20. The method of claim 15, further comprising operating the first portion and second portion of cylinders with even crank angle spacing.

* * * * *